US012803766B2

(12) United States Patent
Ang et al.

(10) Patent No.: US 12,803,766 B2
(45) Date of Patent: Nov. 17, 2026

(54) RADIO FREQUENCY ADAPTATION FOR BANDWIDTH PART WITHOUT RESTRICTION

(71) Applicant: QUALCOMM Incorporated, San Diego, CA (US)

(72) Inventors: Peter Pui Lok Ang, San Diego, CA (US); Yongle Wu, San Diego, CA (US); Alexei Yurievitch Gorokhov, San Diego, CA (US); Arash Ebadi Shahrivar, San Diego, CA (US); Yong Li, San Diego, CA (US); Aamod Khandekar, San Diego, CA (US); Awlok Singh Josan, San Francisco, CA (US); Sandeep Rao, San Diego, CA (US); Antriksh Pany, San Diego, CA (US); Michael Lopez, East Walpole, MA (US); Scott Hoover, Del Mar, CA (US); Asaf Broide, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 17/663,747

(22) Filed: May 17, 2022

(65) Prior Publication Data

US 2023/0117005 A1 Apr. 20, 2023

Related U.S. Application Data

(60) Provisional application No. 63/262,784, filed on Oct. 20, 2021.

(51) Int. Cl.
*H04L 5/00* (2006.01)
*H04W 36/00* (2009.01)

(52) U.S. Cl.
CPC .......... *H04L 5/0098* (2013.01); *H04L 5/0005* (2013.01); *H04L 5/0051* (2013.01); *H04L 5/0053* (2013.01); *H04W 36/0058* (2018.08)

(58) Field of Classification Search
CPC ... H04L 5/0098; H04L 5/0051; H04L 5/0053; H04L 5/0078; H04L 5/0005; H04W 36/0058
See application file for complete search history.

(56) References Cited

U.S. PATENT DOCUMENTS 12,069,540 B2 * 8/2024 Kumar .................. H04L 5/0051
2008/0212553 A1 * 9/2008 Shiu ..................... H03G 3/3036
370/343

(Continued)

FOREIGN PATENT DOCUMENTS

EP 3905810 B1 * 8/2024 ........... H04L 1/1812

OTHER PUBLICATIONS

MediaTek Inc, 3GPP TSG RAN WG1 Meeting #94bis R1-1811850, Chengdu, China, Oct. 8-Oct. 12, 2018, 25 pages (Year: 2018).*

(Continued)

*Primary Examiner* — Mounir Moutaouakil
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, information configuring an active bandwidth part (BWP) that does not include a bandwidth associated with one or more of a synchronization signal block (SSB) or a control resource set zero (CS0). The UE may perform, based at least in part on a radio frequency (RF) retune mode, an RF retune to a union (Continued)

bandwidth that covers the active BWP and the bandwidth associated with one or more of the SSB or the CS0. Numerous other aspects are described.

30 Claims, 9 Drawing Sheets

(56) References Cited

U.S. PATENT DOCUMENTS

| | | | | |
|---|---|---|---|---|
| 2019/0222286 | A1* | 7/2019 | Miao | H04L 5/0048 |
| 2020/0068443 | A1* | 2/2020 | Liu | H04W 72/12 |
| 2020/0367196 | A1* | 11/2020 | Chen | H04L 5/0053 |
| 2020/0374847 | A1* | 11/2020 | Liu | H04W 56/00 |
| 2021/0014823 | A1* | 1/2021 | Takeda | H04L 5/001 |
| 2021/0243680 | A1* | 8/2021 | Harada | H04W 72/23 |
| 2021/0337453 | A1* | 10/2021 | Gao | H04W 52/365 |
| 2022/0022147 | A1* | 1/2022 | Lei | H04W 72/0453 |
| 2022/0224374 | A1* | 7/2022 | Liu | H04B 1/7143 |
| 2023/0144052 | A1* | 5/2023 | Islam | H04W 74/0833<br>370/329 |
| 2023/0180071 | A1* | 6/2023 | Cui | H04W 24/10<br>370/331 |
| 2023/0199678 | A1* | 6/2023 | Cui | H04W 72/23<br>370/503 |
| 2024/0178962 | A1* | 5/2024 | Cui | H04L 5/005 |
| 2024/0244701 | A1* | 7/2024 | Li | H04W 76/28 |

OTHER PUBLICATIONS

CATT: "On Remaining details on RMSI", 3GPP TSG RAN WG1 Meeting 91, R1-1720170, 3rd Generation Partnership Project, Mobile Competence Centre, 650, Route Des Lucioles, F-06921 Sophia-Antipolis Cedex, France, Nov. 18, 2017, pp. 1-20, XP051369806, figures 1-4, section 2.

CATT: "Summary of Offline Discussion on Remaining Minimum System Information", 3GPP TSG RAN WG1 Meeting 91, R1-1721605 (Revision of R1-1721554) Summary for RMSI Issues Nov 30A, 3GPP, Mobile Competence Centre, 650, Route Des Lucioles, F-06921 Sophia-Antipolis Cedex, France, vol. RAN WG1, No. Reno, USA, Nov. 27, 2017-Dec. 1, 2017, 27 Pages, Dec. 1, 2017, XP051370642, figures 1, 2, sections 1, 2.

International Search Report and Written Opinion—PCT/US2022/075734—ISA/EPO—Dec. 1, 2022.

* cited by examiner

RADIO FREQUENCY ADAPTATION FOR BANDWIDTH PART WITHOUT RESTRICTION

CROSS-REFERENCE TO RELATED APPLICATION

This Patent Application claims priority to U.S. Provisional Patent Application No. 63/262,784, filed on Oct. 20, 2021, entitled "RADIO FREQUENCY ADAPTATION FOR BANDWIDTH PART WITHOUT RESTRICTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for radio frequency (RF) adaptation for a bandwidth part (BWP) without restriction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, information configuring an active bandwidth part (BWP) that does not include a bandwidth associated with one or more of a synchronization signal block (SSB) or a control resource set zero (CS0). The method may include performing, based at least in part on a radio frequency (RF) retune mode, an RF retune to a union bandwidth that covers the active BWP and the bandwidth associated with one or more of the SSB or the CS0.

Some aspects described herein relate to a UE for wireless communication. The UE may include a memory and one or more processors coupled to the memory. The one or more processors may be configured to receive, from a network node, information configuring an active BWP that does not include a bandwidth associated with one or more of an SSB or a CS0. The one or more processors may be configured to perform, based at least in part on an RF retune mode, an RF retune to a union bandwidth that covers the active BWP and the bandwidth associated with one or more of the SSB or the CS0.

Some aspects described herein relate to a non-transitory computer-readable medium that stores a set of instructions for wireless communication by a UE. The set of instructions, when executed by one or more processors of the UE, may cause the UE to receive, from a network node, information configuring an active BWP that does not include a bandwidth associated with one or more of an SSB or a CS0. The set of instructions, when executed by one or more processors of the UE, may cause the UE to perform, based at least in part on an RF retune mode, an RF retune to a union bandwidth that covers the active BWP and the bandwidth associated with one or more of the SSB or the CS0.

Some aspects described herein relate to an apparatus for wireless communication. The apparatus may include means for receiving, from a network node, information configuring an active BWP that does not include a bandwidth associated with one or more of an SSB or a CS0. The apparatus may include means for performing, based at least in part on an RF retune mode, an RF retune to a union bandwidth that covers the active BWP and the bandwidth associated with one or more of the SSB or the CS0.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
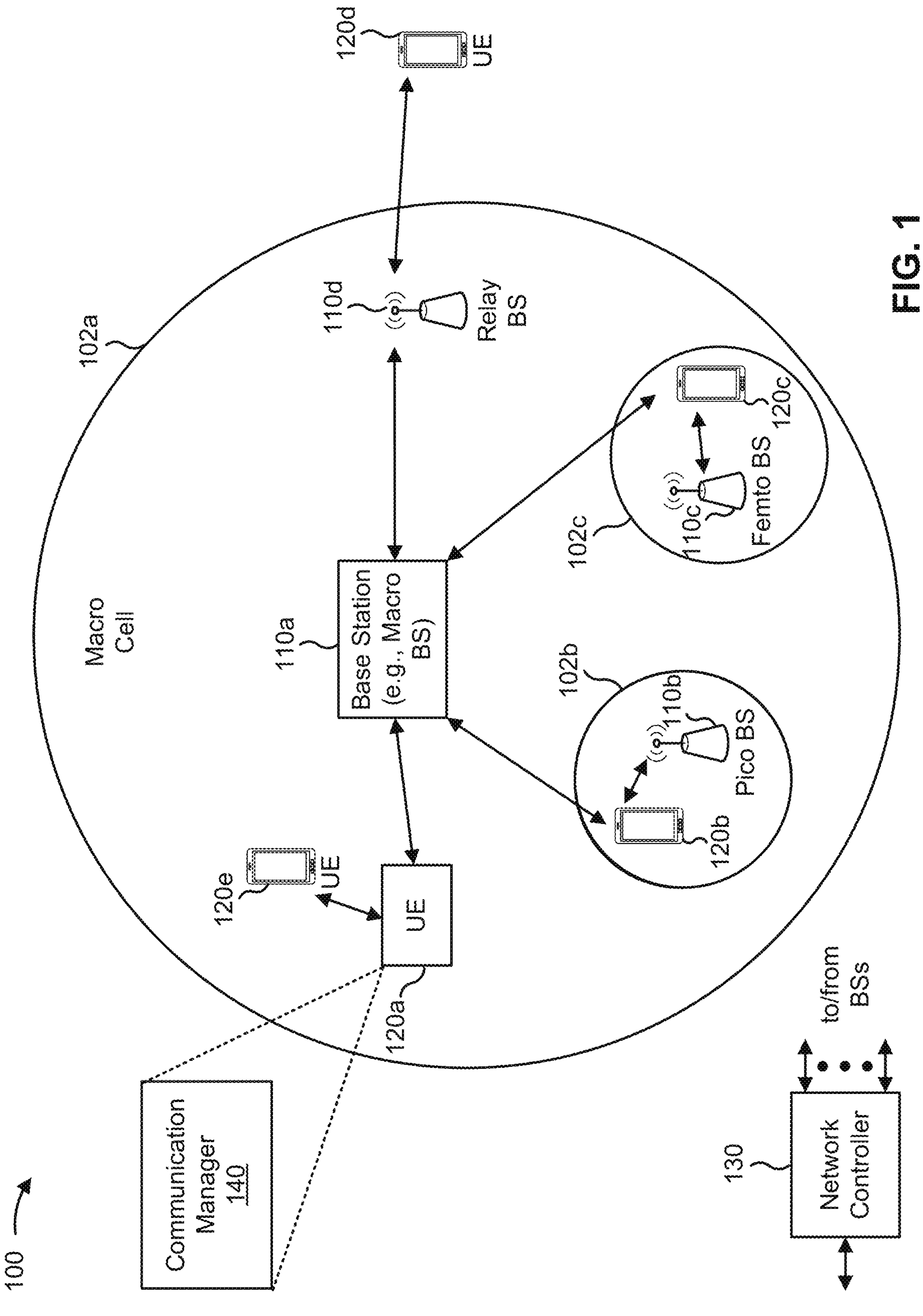
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110_a_, a BS 110_b_, a BS 110_c_, and a BS 110_d_), a user equipment (UE) 120 or multiple UEs 120 (shown as a UE 120_a_, a UE 120_b_, a UE 120_c_, a UE 120_d_, and a UE 120_e_), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may receive, from a network node, information configuring an active bandwidth part (BWP) that does not include a bandwidth associated with one or more of a synchronization signal block (SSB) or a control resource set zero (CS0); and perform, based at least in part on a radio frequency (RF) retune mode, an RF retune to a union bandwidth that covers the active BWP and the bandwidth associated with one or more of the SSB or the CS0. Additionally, or alternatively, the communication manager 140 may perform one or more other operations described herein.

As indicated above, FIG. 1 is provided as an example. Other examples may differ from what is described with regard to FIG. 1.

Figure 2:
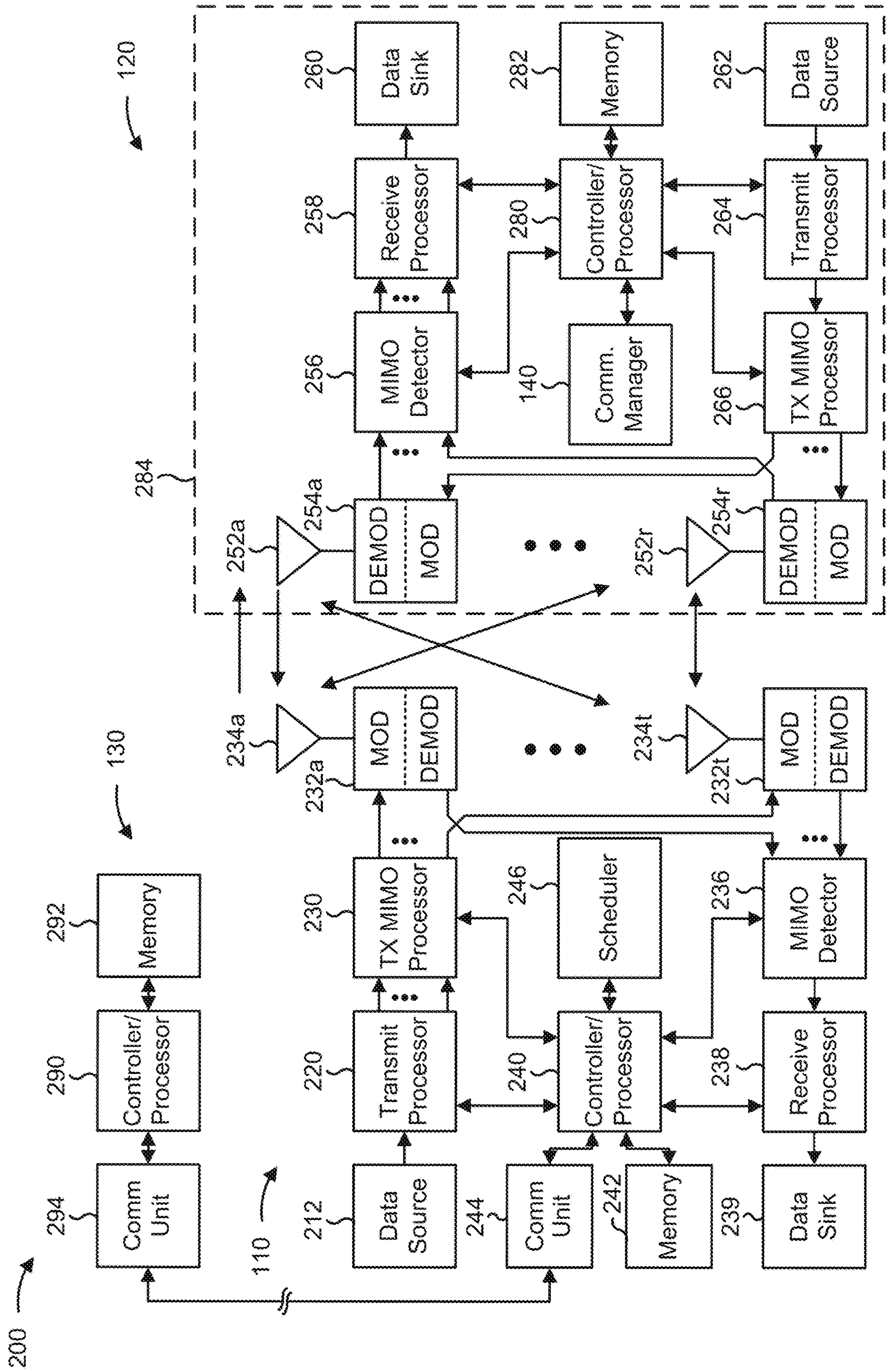
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-5C, FIG. 6, and/or FIG. 7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-5C, FIG. 6, and/or FIG. 7).

The controller/processor 240 of the base station 110, the controller/processor 280 of the UE 120, and/or any other component(s) of FIG. 2 may perform one or more techniques associated with radio frequency (RF) adaptation for a bandwidth part (BWP) without restriction, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE 120 includes means for receiving, from a network node, information configuring an active BWP that does not include a bandwidth associated with one or more of an SSB or a control resource set (CORESET) zero (CS0); and/or means for performing, based at least in part on an RF retune mode, an RF retune to a union bandwidth that covers the active BWP and the bandwidth associated with one or more of the SSB or the CS0. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
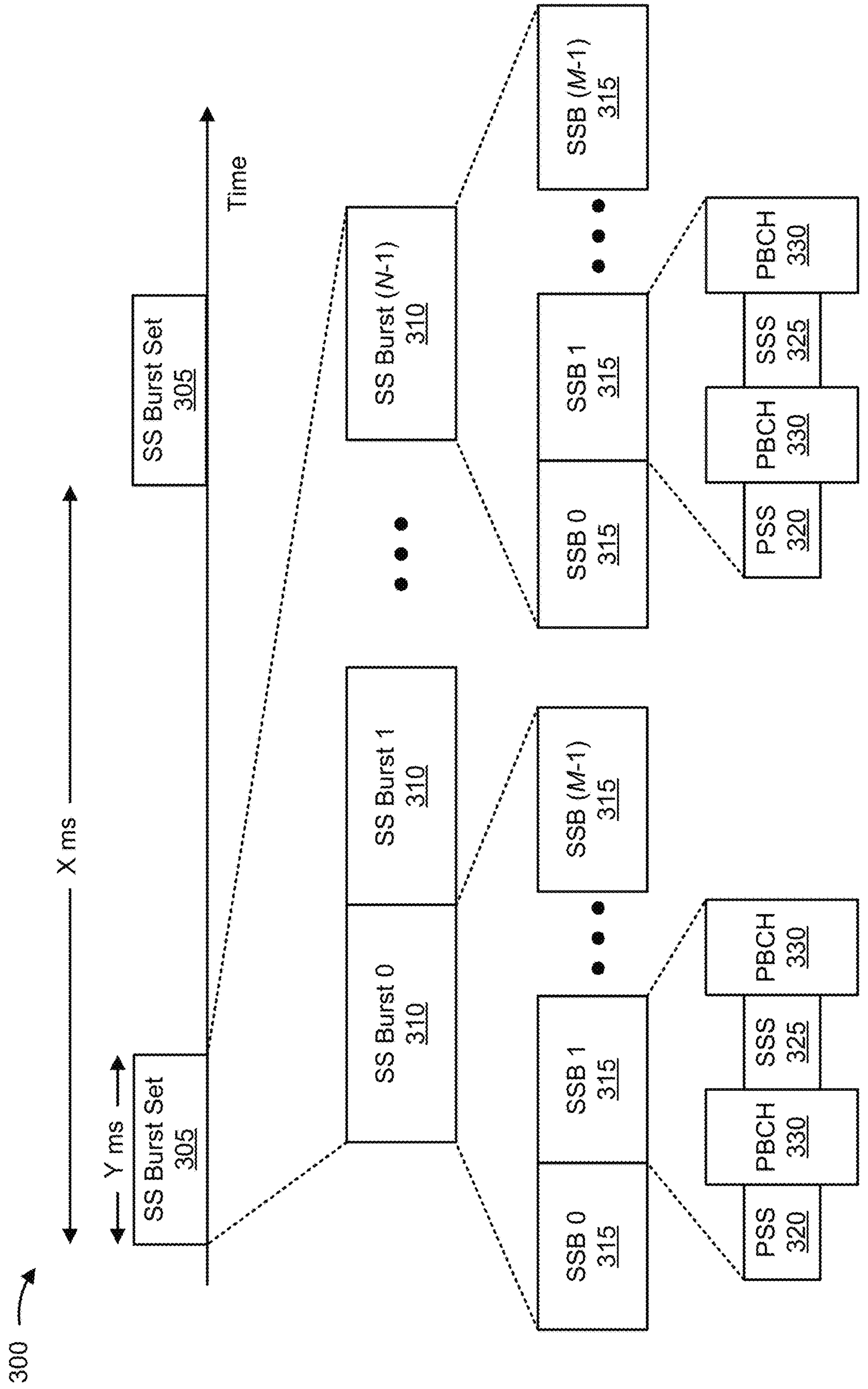
FIG. 3 is a diagram illustrating an example of a synchronization signal hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless node (e.g., base station 110), such as every X milliseconds (e.g., every 160 milliseconds), as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a primary synchronization signal (PSS) 320, a secondary synchronization signal (SSS) 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., an RSRP parameter) to a base station 110. The base station 110 and the UE 120 may use the one or more indicated SSBs 315 to select one or more beams to be used for communication between the base station 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

Figure 4:
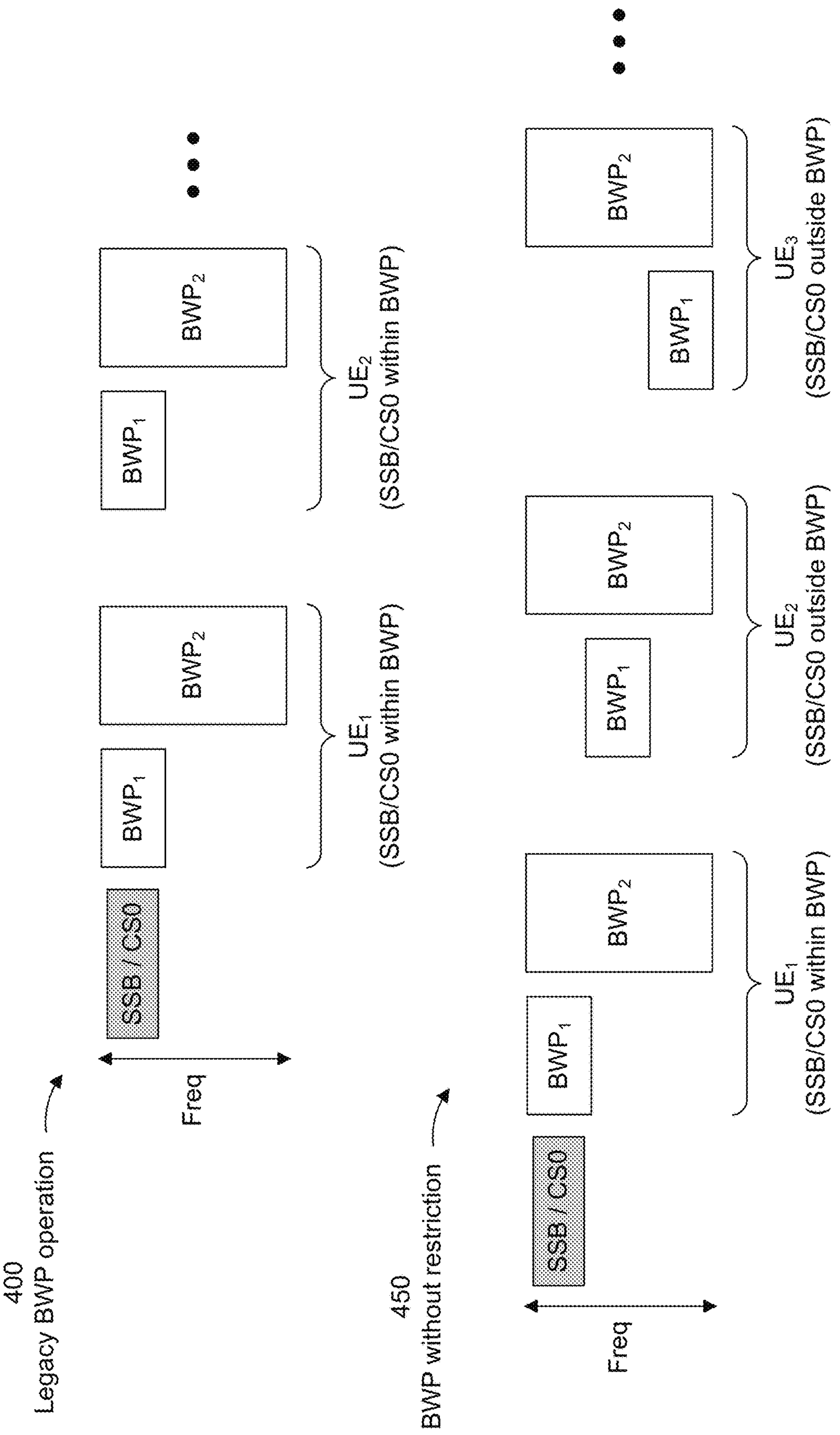
FIG. 4 is a diagram illustrating examples of bandwidth part (BWP) configurations, in accordance with the present disclosure.

FIG. 4 is a diagram illustrating examples 400, 450 of BWP configurations, in accordance with the present disclosure. More particularly, in a wireless network, a base station may configure one or more UEs to communicate using a BWP via radio resource control (RRC) signaling, where a BWP is a bandwidth segment composed of contiguous physical resource blocks (PRBs) within a carrier bandwidth. In general, one or more UEs may be configured to operate within a BWP (rather than the full carrier bandwidth) to dynamically adapt the bandwidth and numerology in which a UE operates and/or provide more flexibility in how resources are assigned in a given carrier. For example, configuring different BWPs within a carrier bandwidth may allow the base station to support multiple services per carrier (e.g., enhanced mobile broadband (eMBB) and massive machine-type communication (mMTC)), which may increase spectrum flexibility. In another example, a BWP may be configured to utilize UE power more efficiently. For example, a UE may be configured to operate using a BWP with a reduced bandwidth in order to save power.

In general, a UE may be configured with up to four BWPs on an uplink and/or up to four BWPs on a downlink, and an additional four BWPs can be configured on a supplementary uplink. However, only one uplink BWP and one downlink BWP are active at a given time, whereby a UE typically cannot transmit a physical uplink control channel (PUCCH) or a physical uplink shared channel (PUSCH), or receive a physical downlink control channel (PDCCH) or a physical downlink shared channel (PDSCH), outside an active BWP. Accordingly, as shown by example 400, BWP operation is typically associated with a restriction, whereby an RRC-configured BWP must include a bandwidth associated with an SSB for a primary cell (PCell) and/or a primary secondary cell (PSCell). Furthermore, in cases where a PCell and/or a PSCell includes a special control resource set (CORESET) used to transmit a PDCCH for scheduling one or more system information blocks (SIBs) (e.g., SIB1) zero (e.g., CORESET #0, or CS0), the RRC-configured BWP must also include the bandwidth associated with the CS0. Furthermore, in cases where there is an SSB on an SCell, the bandwidth of an RRC-configured BWP must include the bandwidth associated with the SSB for the SCell. For example, in FIG. 4, example 400 depicts legacy BWP operation where a first UE and a second UE (shown as $UE_1$ and $UE_2$) are each configured with a first BWP (shown as $BWP_1$) with a reduced bandwidth that may be used for power saving and a second BWP (shown as $BWP_2$) with a larger bandwidth that may be used for increased throughput. As further shown, the first BWP and the second BWP for both UEs include the bandwidth associated with the SSB and the CS0 for the associated cell.

In some cases, although the restriction requiring a BWP to include the bandwidth associated with the SSB and the CS0 (if present) may simplify UE operation, the simplified UE operation may come at the expense of decreased flexibility from the base station perspective. For example, restricting BWP operation in this manner may create a congregation effect for small or reduced BWPs across different UEs because the small or reduced BWPs have to contain at least the SSB and there is only one SSB in a cell (e.g., if a small or reduced BWP is configured to have a 20 MHz bandwidth for all UEs in a cell, all of the small or reduced BWPs that are configured in the cell would have to congregate around the portion of the carrier bandwidth that contains the SSB). In other words, the restriction to include at least the bandwidth of the SSB within the BWP may prevent the network from distributing and/or load balancing the BWPs across the carrier bandwidth, which becomes increasingly problematic as loading increases in a wireless network. Accordingly, one approach that the base station may use to mitigate the congregation effect may be to reduce usage of the small or reduced BWP(s) by configuring more UEs to communicate in the larger BWP(s). Another possible approach to mitigate the congregation effect may be to increase the bandwidth of the small or reduced BWPs in order to increase capacity. However, to the extent that these mitigation techniques can be used to decrease congestion around the bandwidth of the SSB and/or CS0, the decreased congestion comes at the expense of UE power saving.

Accordingly, as shown by example 450, a wireless network may support a BWP without restriction in order to mitigate the congregation effect without increasing UE power consumption. For example, a BWP without restriction is permitted to not include the bandwidth of the SSB and/or the bandwidth of the CS0 within a cell. For example, in FIG. 4, a first UE may be configured with a reduced BWP ($BWP_1$) where the bandwidth of the SSB and/or CS0 is included within the reduced BWP, and a second UE and a third UE may be configured with respective reduced BWPs where the bandwidth of the SSB and/or CS0 is outside the reduced BWP. In this way, the base station may configure reduced BWPs in different locations within the carrier bandwidths, including frequencies that do not span the bandwidth(s) associated with the SSB and/or CS0, which may mitigate the congregation effect without increasing the bandwidth of the reduced BWPs and/or moving UEs to a larger BWP. However, because a UE generally cannot transmit or receive outside an active BWP, configuring a BWP that does not include the bandwidth associated with the SSB and/or CS0 may pose challenges when a UE needs to perform SSB and/or CS0 reception (e.g., the UE may need to receive the SSB to perform an SSB-based loop update or obtain serving cell measurements and/or may need to receive the CS0 to receive a downlink grant that schedules a SIB1 and/or other system information (OSI) transmission).

Accordingly, some aspects described herein relate to techniques and apparatuses to perform RF adaptation for a BWP without restriction. For example, in some aspects, a UE that is configured to operate in an active BWP that does not include a portion of a carrier bandwidth associated with an SSB and/or a CS0 may retune one or more RF components to an expanded union bandwidth that covers both the active BWP and the portion of the carrier bandwidth associated with the SSB and/or CS0. In some aspects, as described herein, the one or more RF components may be retuned to the union bandwidth in a static RF retune mode, where an RF bandwidth corresponds to the union bandwidth during periods when the SSB and/or CS0 are transmitted and during periods when the SSB and/or CS0 are not transmitted. In this way, the UE may use the static RF retune mode in scenarios when the UE may need to receive several SSB and/or CS0 transmissions (e.g., to perform a handover, to receive a system information (SI) modification message or an earthquake tsunami warning system (ETWS) or public warning system (PWS) communication, or to obtain SSB measurements to avoid radio link failure (RLF), among other examples). Additionally, or alternatively, the UE may perform the RF retune to the union bandwidth in a dynamic RF retune mode, where the UE may opportunistically perform an RF retune to the union bandwidth to cover both the active BWP and the SSB/CS0 bandwidth only when both need to be received at a given time, and otherwise retune to the active BWP only to reduce power consumption. Furthermore, some aspects described herein relate to techniques to manage dynamic RF retuning to avoid and/or minimize performance impact and to techniques to configure one or more common search spaces in a BWP without restriction.

As indicated above, FIG. 4 is provided as an example. Other examples may differ from what is described with regard to FIG. 4.

Figure 5A:
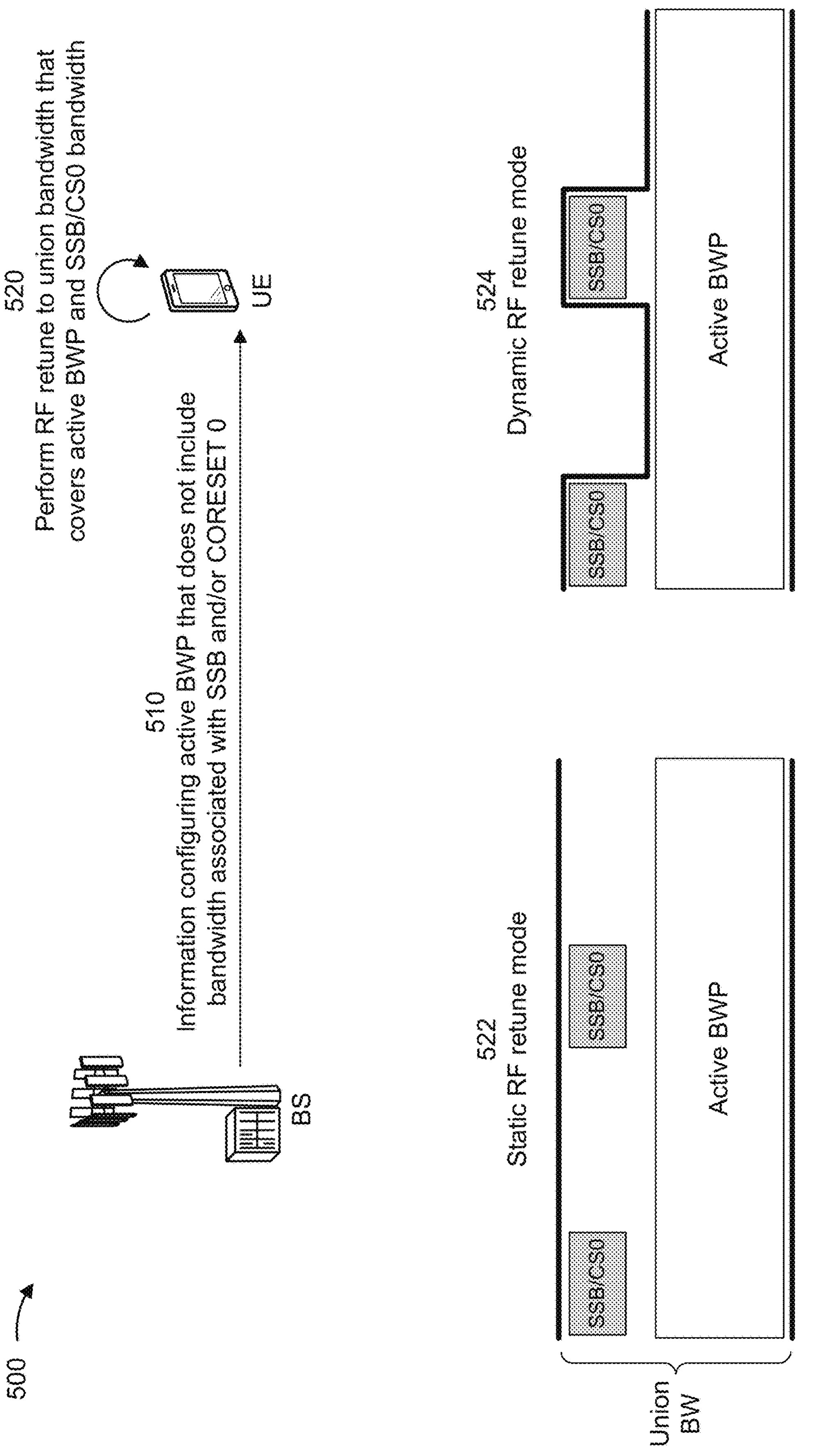
FIGS. 5A-5C are diagrams illustrating examples associated with radio frequency (RF) adaptation for a BWP without restriction, in accordance with the present disclosure.
Figure 5B:
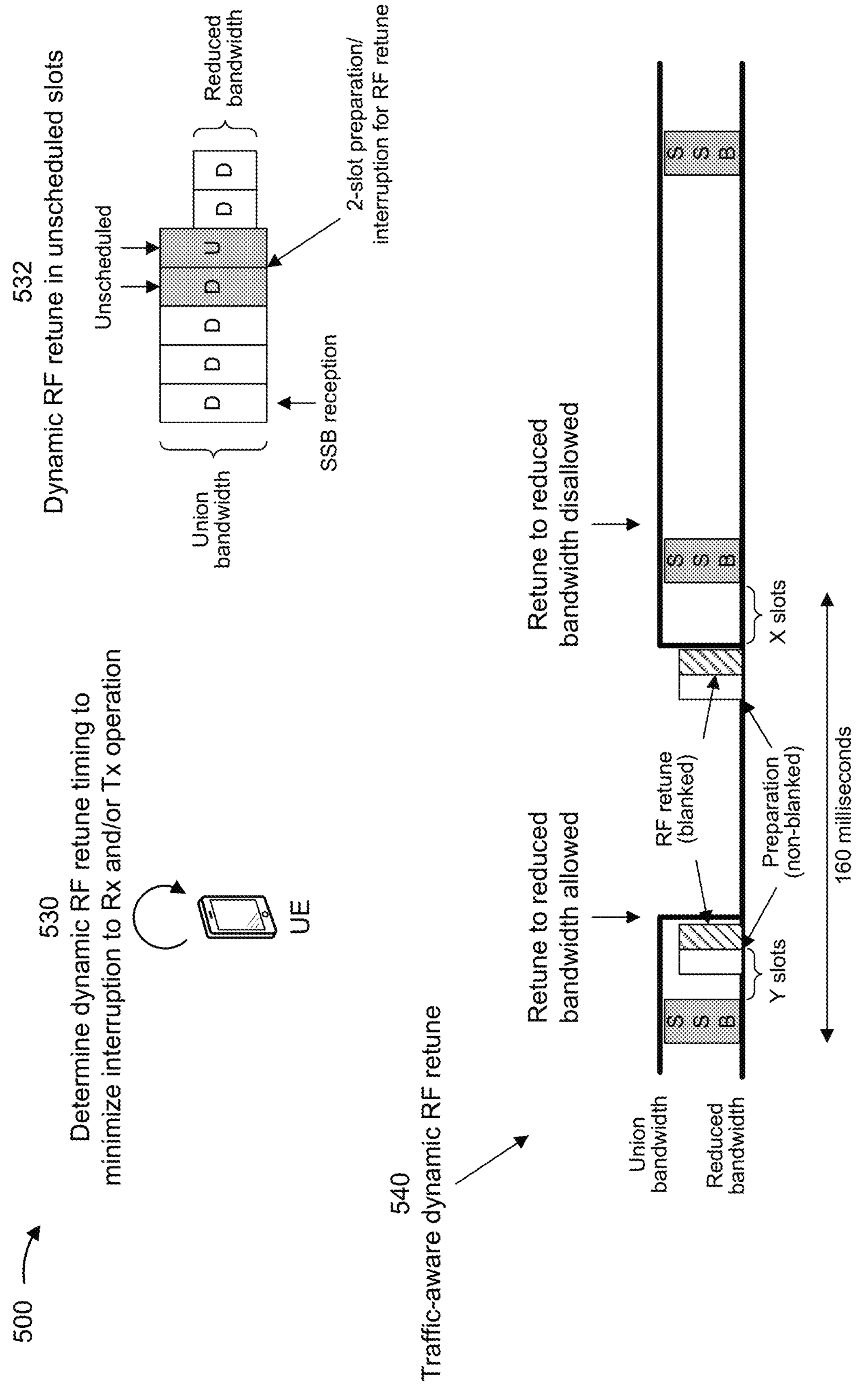
Figure 5C:
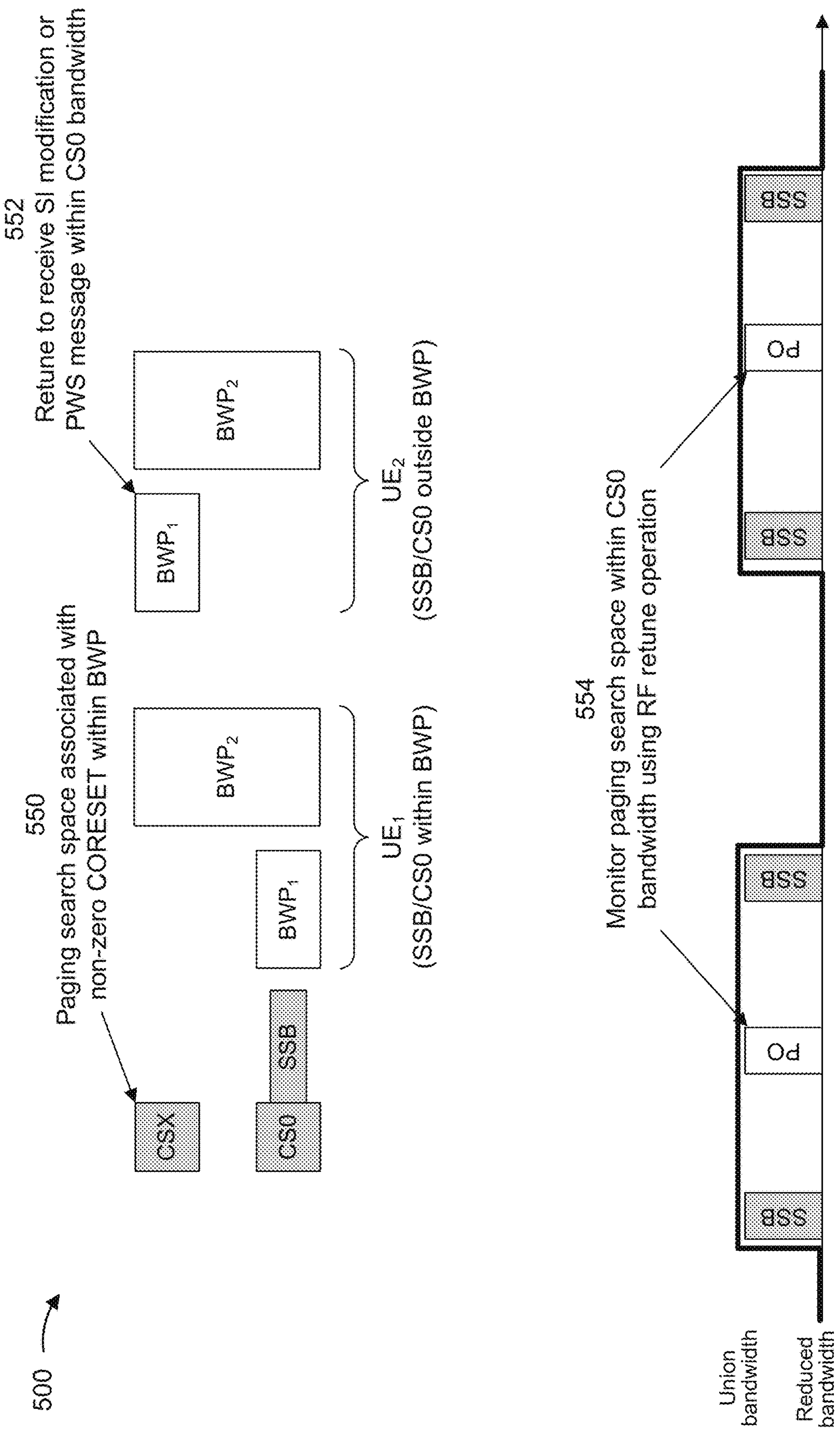

FIGS. 5A-5C are diagrams illustrating examples 500 associated with RF adaptation for a BWP without restriction, in accordance with the present disclosure. As shown in FIGS. 5A-5C, examples 500 include communication between a base station (e.g., base station) 110 and a UE (e.g., UE 120). In some aspects, the base station and the UE may communicate in a wireless network (e.g., wireless network 100) via a wireless access link, which may include an uplink and a downlink.

As shown in FIG. 5A, and by reference number 510, the base station may transmit, and the UE may receive, information configuring an active BWP that does not include a bandwidth associated with an SSB and/or CS0. For example, in some aspects, the base station may transmit RRC signaling to the UE to configure one or more uplink BWPs and/or one or more downlink BWPs and information (e.g., a medium access control (MAC) control element (MAC-CE) and/or downlink control information (DCI)) to indicate an active BWP in which the UE is to operate. In some aspects, in cases where the UE supports a BWP without restriction, the active BWP may include a reduced bandwidth (e.g., a bandwidth that is less than a full carrier bandwidth) that does not include a portion of the carrier bandwidth associated with an SSB and/or CS0. In this way, the base station may configure different UEs to operate in active BWPs that are distributed across the full carrier bandwidth and not congregated around the portion of the carrier bandwidth associated with the SSB and/or CS0 in the corresponding cell. Furthermore, configuring the UE with an active BWP without a restriction that the active BWP include the portion of the carrier bandwidth associated with the SSB and/or CS0 may enable the UE to operate one or more RF components in a reduced bandwidth, which may reduce power consumption at the UE. However, in some cases, the UE may need to receive the SSB and/or CS0 transmitted in a cell (e.g., to perform an SSB-based loop update, satisfy radio link monitoring (RLM) requirements, and/or receive a PDCCH or downlink grant in CS0 that schedules a SIB1 or OSI transmission).

As further shown in FIG. 5A, and by reference number 520, the UE may perform an RF retune to a union bandwidth that covers or otherwise includes the bandwidth of the active BWP and the portion of the carrier bandwidth associated with the SSB or CS0 in the corresponding cell. For example, as shown by reference number 522, the UE may perform the RF retune in a static RF retune mode, where the RF bandwidth is statically configured to be the union bandwidth or frequency span that covers both the active BWP and the portion of the carrier bandwidth associated with the SSB or CS0. In general, the static RF retune mode is simple from a UE implementation perspective, and requires little to no additional complexity when the UE needs to receive one or more SSB and/or CS0 transmissions. However, the static RF retune mode may increase UE power consumption because the RF bandwidth is retuned to the union bandwidth during one or more periods when the SSB and/or CS0 transmissions occur and during one or more periods when there are no SSB and/or CS0 transmissions. In other words, even though the UE may only need to perform SSB and/or CS0 reception periodically or sporadically, the RF bandwidth that is used when operating in the active BWP is not reduced to the smaller bandwidth of the active BWP during periods when the UE does not perform SSB and/or CS0 reception.

Accordingly, as shown by reference number 524, the UE may perform the RF retune in a dynamic RF retune mode, where the UE opportunistically retunes the RF bandwidth to the (expanded) union bandwidth that covers the active BWP and the portion of the carrier bandwidth associated with the SSB or CS0 only when needed to receive one or more SSB and/or CS0 transmissions, and the UE otherwise retunes the RF bandwidth to the smaller reduced bandwidth associated with the active BWP. In this way, the UE may save power by retuning the RF bandwidth to the smaller bandwidth of the active BWP during periods when SSB and/or CS0 transmissions do not occur and/or during periods when the UE does not need to perform SSB and/or CS0 reception. However, the dynamic RF retune mode may be associated with additional complexity to manage dynamically retuning the RF bandwidth in a manner that may avoid or minimize performance impact. Although the base station could configure measurement gaps to help accommodate the interruption or performance impact that may occur due to RF retuning, the measurement gaps may degrade peak throughput by introducing periods when traffic activity is not schedulable. Accordingly, in some aspects, the UE may be configured to switch between the static RF retune mode and the dynamic RF retune mode to balance tradeoffs between power saving, management complexity, and/or performance impacts, among other examples. For example, as described herein, the UE may be configured to perform the RF retune in the static RF retune mode in scenarios that occur relatively infrequently, and may be configured to perform the RF retune in the dynamic RF retune mode to handle more dynamic and recurring conditions.

For example, in some aspects, the UE may be configured to perform an RF retune in the static RF retune mode or switch from the dynamic RF retune mode to the static RF retune mode in cases where the UE determines that there is a need to perform the RF retune to the union bandwidth based on an RRC reconfiguration message triggering a handover to a target cell. In such cases, the UE may need to receive an SSB from the target cell in order to complete the handover. Additionally, or alternatively, the UE may need to receive a SIB1 or OSI transmission in the target cell to complete the handover, whereby the UE may need to perform CS0 reception to receive a PDCCH carrying scheduling information for the SIB1 or OSI transmission. Accordingly, when the UE receives an RRC reconfiguration message or another suitable message triggering a handover to a target cell, the UE may perform an RF retune to the union bandwidth to receive one or more SSB or CS0 transmissions needed to complete the handover.

In another example, the UE may be configured to perform an RF retune in the static RF retune mode or switch from the dynamic RF retune mode to the static RF retune mode in cases where the UE receives a paging short message indicating that the UE is to receive an SI modification message or an ETWS/PWS communication in SIB1 and/or OSI transmitted by the serving cell. Accordingly, in some aspects, the UE may perform the RF retune to the union bandwidth in the static RF retune mode when a paging short message indicates that there has been an SI modification or there is an ETWS/PWS communication to be received by the UE such that the UE may receive the CS0 that includes scheduling information for the SIB1 or OSI transmission carrying the SI modification or ETWS/PWS communication to be received by the UE. Additionally, or alternatively, the UE may be configured to perform an RF retune in the static RF retune mode or switch from the dynamic RF retune mode to the static RF retune mode to avoid RLF in poor channel conditions. For example, when one or more measurements in the serving cell indicate poor channel conditions, the UE may be configured to perform a search to obtain measurements for an SSB in the serving cell and/or one or more neighbor cells in an effort to avoid entering RLF. Accordingly, in some aspects, the UE may perform the search to obtain the SSB measurements in the static RF retune mode to enable frequent SSB reception that may avoid RLF. In these cases, the scenario(s) underlying the use of the static RF retune mode may be relatively infrequent such that the additional power consumption is minimized, or SSB/CS0 reception may be more important than power savings. However, in other scenarios, the UE may perform the RF retune in the dynamic RF retune mode and/or may switch from the static RF retune mode to the dynamic RF retune mode to conserve power.

For example, in some aspects, the UE may enable the dynamic RF retune mode in cases where one or more serving cell measurements (e.g., a frequency error and/or an SSB signal-to-noise ratio (SNR), among other examples) indicate that tracking conditions are stable in a time domain, a frequency domain, and/or a spatial domain. For example, when the one or more serving cell measurements indicate stable time, frequency, and/or beam tracking conditions, the UE may reduce a rate at which an SSB-based loop update is performed, which may reduce the number of SSB transmissions that the UE needs to receive and thereby increase a duration that the UE can remain in the smaller bandwidth of the active BWP. Otherwise, in cases where the UE needs to perform frequent SSB reception, the management complexity and/or performance impact associated with performing the RF retune to the smaller bandwidth may outweigh the potential power savings from operating at the smaller bandwidth. Additionally, or alternatively, the UE may enable the dynamic RF retune mode in cases where SSB reception for serving cell measurements occurs infrequently (e.g., based on RLM requirements, a connected-mode discontinuous reception (CDRX) cycle, and/or UE implementation, among other examples).

As shown in FIG. 5B, and by reference number 530, the UE may determine a dynamic RF retune timing to be applied in cases where the dynamic RF retune mode is enabled. For example, as described herein, the dynamic RF retune timing may indicate a time when the UE performs an RF retune from the reduced bandwidth of the active BWP to the expanded union bandwidth that further covers the bandwidth of the SSB or CS0, or a time when the UE performs an RF retune from the union bandwidth to the reduced bandwidth of the active BWP. In either case, the RF retune may cause an interruption to receive operation, transmit operation, or both. Accordingly, in some aspects, the UE may determine the dynamic RF retune timing to minimize the occurrences of interrupted receive and/or transmit operations and/or to minimize a performance impact associated with interrupted receive and/or transmit operations. For example, in a time division duplexing (TDD) configuration where the UE may perform receive operations only during downlink slots and transmit operations only during uplink slots, the UE may determine whether a dynamic RF retune operation causes an interruption to receive operation, transmit operation, or both. In cases where the dynamic RF retune causes an interruption to receive operation only, the UE may perform the dynamic RF retune during one or more uplink slots. Additionally, or alternatively, the UE may perform the dynamic RF retune during one or more downlink slots in cases where the dynamic RF retune causes an interruption to transmit operation only. Additionally, or alternatively, in cases where the dynamic RF retune may cause an interruption to receive operation and transmit operation, the UE may place the dynamic RF retune timing within one or more downlink slots or one or more uplink slots (e.g., depending on whether downlink or uplink operation has a higher priority).

Alternatively, as further shown in FIG. 5B, and by reference number 532, the UE may opportunistically perform the dynamic RF retune during one or more unscheduled slots in cases where the dynamic RF retune may cause an interruption to receive operation and transmit operation. For example, in some aspects, the base station may configure the UE with a minimum k0 parameter that defines a minimum number of slots between a first slot in which the UE receives a downlink grant scheduling a downlink transmission and a second slot in which the downlink transmission is scheduled. Additionally, or alternatively, the base station may configure the UE with a minimum k2 parameter that defines a minimum number of slots between a first slot in which the UE receives an uplink grant scheduling an uplink transmission and a second slot in which the uplink transmission is scheduled. Accordingly, for downlink slots with a minimum k0 parameter equal to zero (0) or uplink slots with a minimum k2 parameter equal to zero (0) (e.g., same-slot scheduling is enabled in downlink slots and/or uplink slots), the UE may be unable to determine whether a slot associated with same-slot scheduling is unscheduled or not until PDCCH blind decoding is finished. However, in cases where the minimum k0 parameter and/or the minimum k2 parameter have values greater than one (1) (e.g., cross-slot scheduling is enabled), the UE may be able to identify unscheduled slots earlier in time. In such cases, after the UE has made a decision to perform a dynamic RF retune from the reduced bandwidth to the union bandwidth or vice versa, the UE may monitor a PDCCH to identify a number of consecutive unscheduled slots that can accommodate the RF retune operation.

For example, the RF retune operation may be associated with a preparation time that is needed to prepare one or more RF components for retuning and an interruption time during which receive and/or transmit operations are interrupted while the RF retune is performed (e.g., in FIG. 5B, the UE has an RF configuration in which an RF retune is associated with a 2-slot preparation and interruption time). Accordingly, the number of consecutive unscheduled slots to be identified may be based at least in part on the preparation time and the interruption time associated with the dynamic RF retune, and the UE may monitor the PDCCH to identify a number of consecutive slots that can accommodate the dynamic RF retune. For example, in FIG. 5B where the UE is operating at the union bandwidth to perform SSB and/or CS0 reception and the combined preparation and interruption time is two (2) slots, the UE may monitor the PDCCH to identify two (2) consecutive unscheduled slots following the desired SSB and/or CS0 reception and may perform the dynamic RF retune during such slots to minimize the interruption to receive operation and/or transmit operation. Furthermore, the probability of the UE being able to find an opportunity to perform the dynamic RF retune may be increased in cases where the UE is configured with a larger minimum k0 parameter and/or a larger minimum k2 parameter and/or in cases where the combined preparation and interruption time is within one (1) slot (e.g., potentially enabling the RF retune to be performed with little or no performance impact even if same-slot scheduling is enabled). Alternatively, in cases where the UE monitors the PDCCH and a threshold number of slots elapse without the UE identifying a number of consecutive unscheduled slots that can accommodate the dynamic RF retune, the UE may force the dynamic RF retune after the threshold number of slots have elapsed (e.g., taking the performance impact in order to conserve power or ensure reliable SSB/CS0 reception).

In some aspects, in the dynamic RF retune mode described herein, the UE may generally perform the RF retune from the reduced bandwidth associated with the active BWP to the union bandwidth that covers the active BWP and the bandwidth associated with one or more of an SSB or a CS0, or the UE may perform the RF retune from the union bandwidth to the reduced bandwidth associated with the active BWP. Accordingly, based at least in part on whether the UE is performing the RF retune to the union bandwidth (e.g., to enable SSB and/or CS0 reception) or to the active BWP (e.g., to conserve power following SSB and/or CS0 reception), the UE may perform the RF retune when one or more conditions are satisfied. For example, the UE may perform the RF retune to expand the RF bandwidth from the reduced bandwidth of the active BWP to the union bandwidth when SSB and/or CS0 reception is scheduled within a timing threshold (e.g., the UE may retune to the union bandwidth upon waking up from a discontinuous reception (DRX) cycle based at least in part on determining that SSB reception is expected to occur in an on duration of the DRX cycle). Additionally, or alternatively, the UE may perform the RF retune to the reduced bandwidth of the active BWP based at least in part on performing SSB and/or CS0 reception and determining that a next SSB and/or CS0 reception is beyond a timing threshold. Additionally, or alternatively, as shown by reference number 540, the UE may perform the RF retune in a traffic-aware manner, where the RF retune may be allowed or disallowed depending on traffic conditions.

For example, as shown in FIG. 5B, there may be an offset duration after SSB reception (shown as Y slots) before the UE can perform the dynamic RF retune from the union bandwidth to the reduced bandwidth of the active BWP, where the offset duration may include a (non-blanked) preparation time that precedes a (blanked) interruption time associated with the dynamic RF retune. Similarly, when retuning from the reduced bandwidth of the active BWP to the union bandwidth, there may be an offset duration (shown as X slots) after the RF retune is completed before SSB reception can occur. For example, as described above, the offset associated with retuning to the reduced bandwidth of the active BWP and/or the offset associated with retuning to the union bandwidth may be caused by the location of uplink and/or downlink slots in a TDD pattern relative to the position(s) of the SSB and/or the dynamic RF retune causing interruption to receive or transmit operations.

Accordingly, when performing the dynamic RF retune operation, the UE may be configured to employ the traffic-aware RF retune conditions in order to ensure that any interruption to receive and/or transmit operations is minimal. For example, in cases where the dynamic RF retune can cause interruptions that may potentially collide with other signals (e.g., downlink grants carried on a PDCCH), the UE may be unable to determine an optimal placement for the dynamic RF retune operation. In some aspects, to minimize the impact from the interruption, the UE may apply a rule in which an RF retune from the union bandwidth to the reduced bandwidth is disallowed in certain transmission time intervals where traffic activity satisfies (e.g., equals or exceeds) a threshold, or allowed in transmission time intervals where traffic activity fails to satisfy the threshold. For example, the RF retune from the union bandwidth to the reduced bandwidth may be disallowed in downlink slots where downlink traffic activity satisfies a threshold or allowed in downlink slots where downlink traffic activity fails to satisfy the threshold. In some aspects, the UE may estimate the traffic activity based on the number of downlink or uplink grants that are received within a certain time window, where the decision regarding whether the estimated traffic activity satisfies or fails to satisfy the threshold may be based on a short-term time window, a long-term time window, or a combination thereof. In this way, when traffic activity is high such that a downlink or uplink grant density is high, the UE may avoid (or delay) performing the RF retune and remain in the union bandwidth until traffic activity is reduced, to mitigate the probability that the interruption caused by the RF retune will collide with a downlink or uplink grant.

In some aspects, as shown in FIG. 5C, the base station may further provide the UE with information to configure one or more common search spaces associated with a BWP without restriction (e.g., a BWP that is permitted to not include a bandwidth associated with an SSB and/or CS0). For example, as shown by reference number 550, the one or more common search spaces associated with a BWP without restriction may include a paging search space that may be configured as a non-zero common search space associated with a non-zero CORESET within the BWP. For example, in FIG. 5C, a first UE may be configured with a BWP in legacy operation, where the BWP includes the portion of the carrier bandwidth associated with the SSB and CS0. However, a second UE may be configured with a BWP without restriction, where the BWP does not include the portion of the carrier bandwidth associated with the SSB and CS0 (although it will be appreciated that a BWP without restriction is permitted to include the portion of the carrier bandwidth associated with the SSB and CS0). In this case, the second UE may be configured with a non-zero CORESET (shown as CSX in FIG. 5C) within the BWP, and the non-zero CORESET may be used as a paging search space that the UE can monitor for indications of an SI modification and/or an ETWS/PWS communication. For example, as shown by reference number 552, the UE may generally monitor the paging search space associated with the non-zero CORESET and may retune to the union bandwidth to receive scheduling information for a SIB1 carrying the SI modification or OSI carrying the ETWS/PWS communication within the CS0 bandwidth when the paging search space includes an indication of an SI modification and/or an ETWS/PWS communication. Alternatively, as shown by reference number 554, the paging search space may be configured outside the BWP (e.g., within CS0), and the UE may monitor the paging search space outside the BWP using the static and/or dynamic RF retune modes described herein. For example, the paging search space configured outside the BWP may be associated with a different subscription on the same cell in cases where the UE supports multiple subscriber identity modules (multi-SIM).

Furthermore, in some aspects, the one or more common search spaces may include a SIB1 search space and/or an OSI search space that may be within or outside the BWP without restriction. For example, a UE in connected mode may be expected to monitor the SIB1 search space relatively rarely (e.g., when an SI modification is indicated in a paging search space), and may be similarly expected to monitor the OSI search space relatively rarely (e.g., when a message in a paging search space indicates that there is an ETWS/PWS message to be received by the UE). Accordingly, in some aspects, the SIB1 search space and/or the OSI search space may be configured outside the BWP without restriction (e.g., the base station may avoid a need to configure the SIB1 search space and/or the OSI search space as a non-zero common search space within the BWP without restriction), and the UE may support SIB1 and/or OSI reception outside the BWP without restriction using the static and/or dynamic RF retune modes described herein (e.g., by expanding or retuning to the union bandwidth to receive a SIB1 or OSI transmission within the bandwidth associated with the CS0).

As indicated above, FIGS. 5A-5C are provided as examples. Other examples may differ from what is described with regard to FIGS. 5A-5C.

Figure 6:
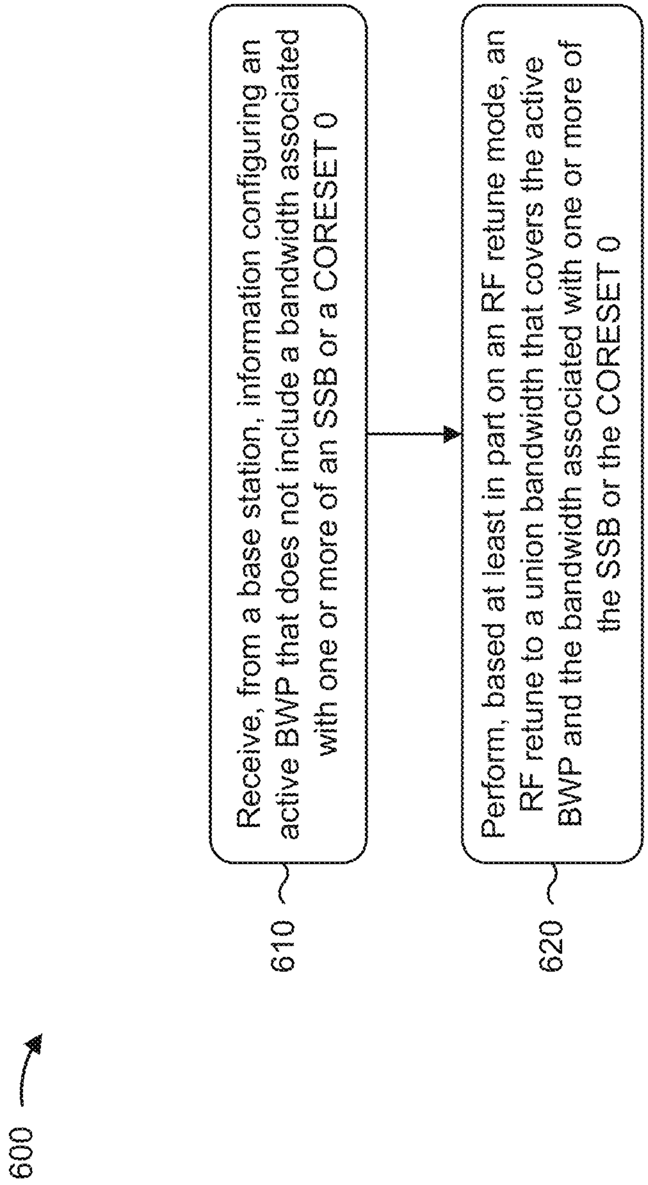
FIG. 6 is a diagram illustrating an example process associated with RF adaptation for a BWP without restriction, in accordance with the present disclosure.

FIG. 6 is a diagram illustrating an example process 600 performed, for example, by a UE in accordance with the present disclosure. Example process 600 is an example where the UE (e.g., UE 120) performs operations associated with RF adaptation for a BWP without restriction.

As shown in FIG. 6, in some aspects, process 600 may include receiving, from a network node, information configuring an active BWP that does not include a bandwidth associated with one or more of an SSB or a CS0 (block 610). For example, the UE (e.g., using communication manager 140 and/or reception component 702, depicted in FIG. 7) may receive, from a network node, information configuring an active BWP that does not include a bandwidth associated with one or more of an SSB or a CS0, as described above.

As further shown in FIG. 6, in some aspects, process 600 may include performing, based at least in part on an RF retune mode, an RF retune to a union bandwidth that covers the active BWP and the bandwidth associated with one or more of the SSB or the CS0 (block 620). For example, the UE (e.g., using communication manager 140 and/or RF retune component 708, depicted in FIG. 7) may perform, based at least in part on an RF retune mode, an RF retune to a union bandwidth that covers the active BWP and the bandwidth associated with one or more of the SSB or the CS0, as described above.

Process 600 may include additional aspects, such as any single aspect or any combination of aspects described below and/or in connection with one or more other processes described elsewhere herein.

In a first aspect, the RF retune mode is a static RF retune mode in which the union bandwidth covers the active BWP and the bandwidth associated with one or more of the SSB or the CS0 during one or more periods in which neither the SSB nor the CS0 is received.

In a second aspect, alone or in combination with the first aspect, the RF retune is performed in the static RF retune mode based at least in part on receiving a message triggering a handover.

In a third aspect, alone or in combination with one or more of the first and second aspects, the RF retune is performed in the static RF retune mode based at least in part on receiving a paging message indicating one or more of an SI modification or a PWS communication.

In a fourth aspect, alone or in combination with one or more of the first through third aspects, the RF retune is performed in the static RF retune mode based at least in part on one or more measurements indicating poor channel conditions.

In a fifth aspect, alone or in combination with one or more of the first through fourth aspects, the RF retune mode is a dynamic RF retune mode in which the union bandwidth covers the active BWP and the bandwidth associated with one or more of the SSB or the CS0 only during one or more periods in which the SSB or the CS0 is received.

In a sixth aspect, alone or in combination with one or more of the first through fifth aspects, the RF retune is performed in the dynamic RF retune mode based at least in part on one or more measurements indicating a stable tracking condition in one or more of a time, frequency, or spatial domain.

In a seventh aspect, alone or in combination with one or more of the first through sixth aspects, the RF retune is performed in the dynamic RF retune mode based at least in part on a reception rate associated with the SSB satisfying a threshold.

In an eighth aspect, alone or in combination with one or more of the first through seventh aspects, one or more of the RF retune to the union bandwidth or an RF retune to the active BWP is performed during one or more uplink slots based at least in part on the dynamic RF retune mode causing an interruption to a receive operation.

In a ninth aspect, alone or in combination with one or more of the first through eighth aspects, one or more of the RF retune to the union bandwidth or an RF retune to the active BWP is performed during one or more downlink slots based at least in part on the dynamic RF retune mode causing an interruption to a transmit operation.

In a tenth aspect, alone or in combination with one or more of the first through ninth aspects, one or more of the RF retune to the union bandwidth or an RF retune to the active BWP is performed during one or more downlink slots or one or more uplink slots based at least in part on the dynamic RF retune mode causing an interruption to a receive operation and a transmit operation.

In an eleventh aspect, alone or in combination with one or more of the first through tenth aspects, one or more of the RF retune to the union bandwidth or an RF retune to the active BWP is performed during one or more unscheduled slots based at least in part on the dynamic RF retune mode causing an interruption to a receive operation and a transmit operation.

In a twelfth aspect, alone or in combination with one or more of the first through eleventh aspects, performing the RF retune in the dynamic RF retune mode includes monitoring a physical downlink control channel to identify unscheduled slots, determining that the unscheduled slots include a number of consecutive unscheduled slots that can accommodate the RF retune, and performing the RF retune to the union bandwidth or the RF retune to the active BWP during the number of consecutive unscheduled slots.

In a thirteenth aspect, alone or in combination with one or more of the first through twelfth aspects, the number of consecutive unscheduled slots is based at least in part on one or more of a preparation time associated with the RF retune or an interruption time associated with the dynamic RF retune mode.

In a fourteenth aspect, alone or in combination with one or more of the first through thirteenth aspects, performing the RF retune in the dynamic RF retune mode includes monitoring a PDCCH to identify unscheduled slots, determining that a maximum number of slots have elapsed without identifying a number of consecutive unscheduled slots that can accommodate the RF retune, and performing the RF retune to the union bandwidth or the RF retune to the active BWP after the maximum number of slots have elapsed.

In a fifteenth aspect, alone or in combination with one or more of the first through fourteenth aspects, the RF retune to the union bandwidth is performed based at least in part on determining that a next scheduled reception of one or more of the SSB or the CS0 is within a timing threshold.

In a sixteenth aspect, alone or in combination with one or more of the first through fifteenth aspects, process 600 includes receiving one or more of the SSB or the CS0 in the union bandwidth, and performing, in the dynamic RF retune mode, an RF retune from the union bandwidth to the active BWP after receiving one or more of the SSB or the CS0, based at least in part on determining that a next scheduled reception of one or more of the SSB or the CS0 is not within a timing threshold.

In a seventeenth aspect, alone or in combination with one or more of the first through sixteenth aspects, performing the RF retune from the union bandwidth to the active BWP is further based at least in part on estimated downlink traffic activity or estimated uplink traffic activity satisfying a threshold.

In an eighteenth aspect, alone or in combination with one or more of the first through seventeenth aspects, process 600 includes receiving one or more of the SSB or the CS0 in the union bandwidth, and remaining in the union bandwidth after receiving one or more of the SSB or the CS0 based at least in part on estimated downlink traffic activity or estimated uplink traffic activity failing to satisfy a threshold.

In a nineteenth aspect, alone or in combination with one or more of the first through eighteenth aspects, process 600 includes receiving, from the network node, information configuring a paging search space as a non-zero common search space associated with a CORESET within the active BWP, and monitoring the paging search space for a notification related to an SI modification or a PWS communication, wherein the RF retune to the union bandwidth is performed to receive the SI modification or the PWS communication in an SI block or OSI within the bandwidth associated with the CS0.

In a twentieth aspect, alone or in combination with one or more of the first through nineteenth aspects, process 600 includes receiving, from the network node, information configuring one or more common search spaces outside the active BWP, wherein the union bandwidth covers the one or more common search spaces.

In a twenty-first aspect, alone or in combination with one or more of the first through twentieth aspects, the one or more common search spaces include one or more of a paging search space, an SIB search space, or an OSI search space.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
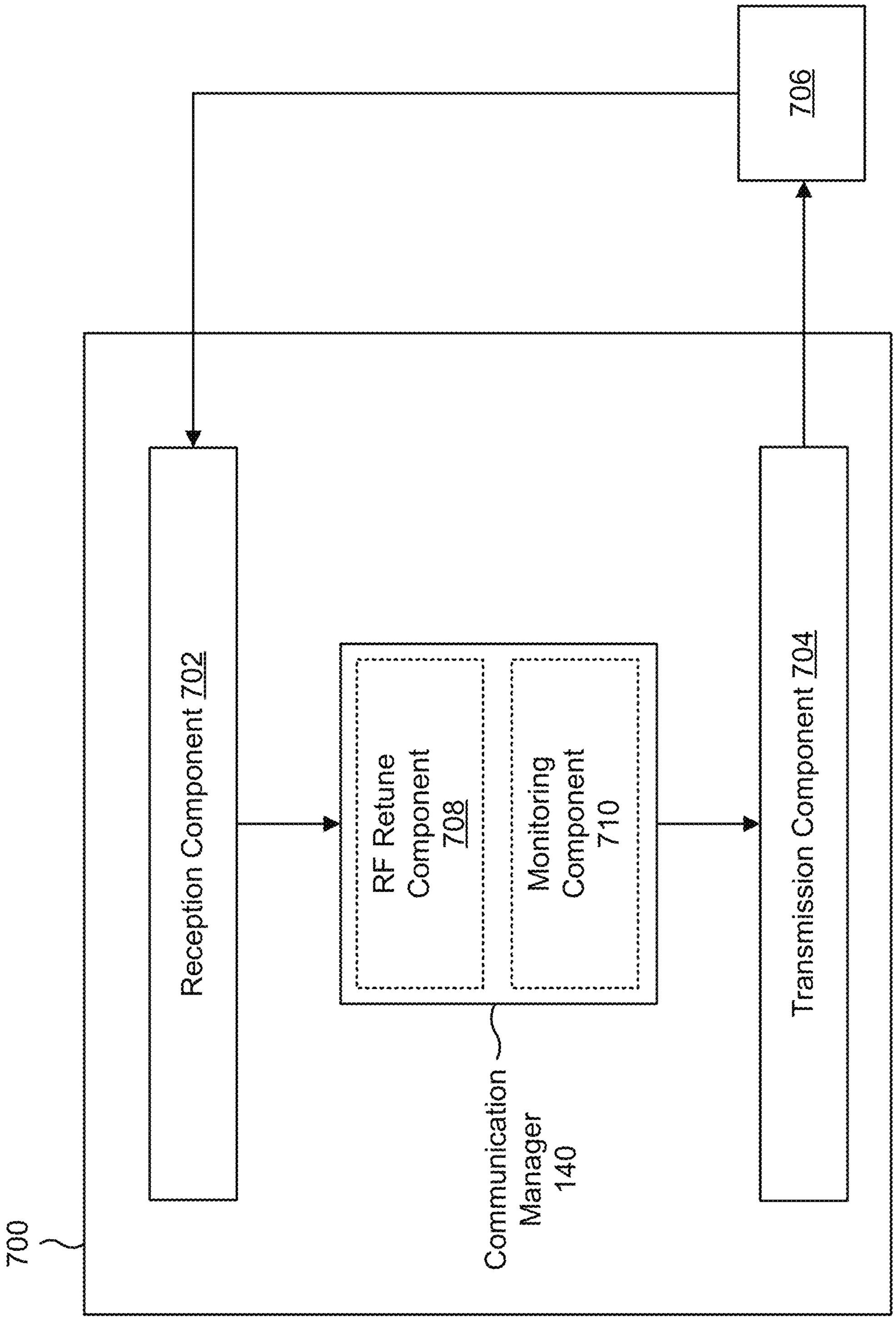
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an RF retune component 708 or a monitoring component 710, among other examples.

In some aspects, the apparatus 700 may be configured to perform one or more operations described herein in connection with FIGS. 5A-5C. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, from a network node, information configuring an active BWP that does not include a bandwidth associated with one or more of an SSB or a CS0. The RF retune component 708 may perform, based at least in part on an RF retune mode, an RF retune to a union bandwidth that covers the active BWP and the bandwidth associated with one or more of the SSB or the CS0.

The monitoring component 710 may monitor a PDCCH to identify unscheduled slots. The RF retune component 708 may determine that the unscheduled slots include a number of consecutive unscheduled slots that can accommodate the RF retune. The RF retune component 708 may perform the RF retune to the union bandwidth or the RF retune to the active BWP during the number of consecutive unscheduled slots.

The monitoring component 710 may monitor a PDCCH to identify unscheduled slots. The RF retune component 708 may determine that a maximum number of slots have elapsed without identifying a number of consecutive unscheduled slots that can accommodate the RF retune. The RF retune component 708 may perform the RF retune to the union bandwidth or the RF retune to the active BWP after the maximum number of slots have elapsed.

The reception component 702 may receive one or more of the SSB or the CS0 in the union bandwidth. The RF retune component 708 may perform, in the dynamic RF retune mode, an RF retune from the union bandwidth to the active BWP after receiving one or more of the SSB or the CS0 based at least in part on determining that a next scheduled reception of one or more of the SSB or the CS0 is not within a timing threshold.

The reception component 702 may receive one or more of the SSB or the CS0 in the union bandwidth. The RF retune component 708 may remain in the union bandwidth after receiving one or more of the SSB or the CS0 based at least in part on estimated downlink traffic activity or estimated uplink traffic activity failing to satisfy a threshold.

The reception component 702 may receive, from the network node, information configuring a paging search space as a non-zero common search space associated with a CORESET within the active BWP. The monitoring component 710 may monitor the paging search space for a notification related to an SI modification or a PWS communication, wherein the RF retune to the union bandwidth is performed to receive the SI modification or the PWS communication in an SIB or OSI within the bandwidth associated with the CS0.

The reception component 702 may receive, from the network node, information configuring one or more common search spaces outside the active BWP, wherein the union bandwidth covers the one or more common search spaces.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: receiving, from a network node, information configuring an active BWP that does not include a bandwidth associated with one or more of an SSB or a CS0; and performing, based at least in part on an RF retune mode, an RF retune to a union bandwidth that covers the active BWP and the bandwidth associated with one or more of the SSB or the CS0.

Aspect 2: The method of Aspect 1, wherein the RF retune mode is a static RF retune mode in which the union bandwidth covers the active BWP and the bandwidth associated with one or more of the SSB or the CS0 during one or more periods in which neither the SSB nor the CS0 is received.

Aspect 3: The method of Aspect 2, wherein the RF retune is performed in the static RF retune mode based at least in part on receiving a message triggering a handover.

Aspect 4: The method of any of Aspects 2-3, wherein the RF retune is performed in the static RF retune mode based at least in part on receiving a paging message indicating one or more of an SI modification or a PWS communication.

Aspect 5: The method of any of Aspects 2-4, wherein the RF retune is performed in the static RF retune mode based at least in part on one or more measurements indicating poor channel conditions.

Aspect 6: The method of Aspect 1, wherein the RF retune mode is a dynamic RF retune mode in which the union bandwidth covers the active BWP and the bandwidth associated with one or more of the SSB or the CS0 only during one or more periods in which the SSB or the CS0 is received.

Aspect 7: The method of Aspect 6, wherein the RF retune is performed in the dynamic RF retune mode based at least in part on one or more measurements indicating a stable tracking condition in one or more of a time, frequency, or spatial domain.

Aspect 8: The method of any of Aspects 6-7, wherein the RF retune is performed in the dynamic RF retune mode based at least in part on a reception rate associated with the SSB satisfying a threshold.

Aspect 9: The method of any of Aspects 6-8, wherein one or more of the RF retune to the union bandwidth or an RF retune to the active BWP is performed during one or more uplink slots based at least in part on the dynamic RF retune mode causing an interruption to a receive operation.

Aspect 10: The method of any of Aspects 6-9, wherein one or more of the RF retune to the union bandwidth or an RF retune to the active BWP is performed during one or more downlink slots based at least in part on the dynamic RF retune mode causing an interruption to a transmit operation.

Aspect 11: The method of any of Aspects 6-10, wherein one or more of the RF retune to the union bandwidth or an RF retune to the active BWP is performed during one or more downlink slots or one or more uplink slots based at least in part on the dynamic RF retune mode causing an interruption to a receive operation and a transmit operation.

Aspect 12: The method of any of Aspects 6-11, wherein one or more of the RF retune to the union bandwidth or an RF retune to the active BWP is performed during one or more unscheduled slots based at least in part on the dynamic RF retune mode causing an interruption to a receive operation and a transmit operation.

Aspect 13: The method of Aspect 12, wherein performing the RF retune in the dynamic RF retune mode includes: monitoring a PDCCH to identify unscheduled slots; determining that the unscheduled slots include a number of consecutive unscheduled slots that can accommodate the RF retune; and performing the RF retune to the union bandwidth or the RF retune to the active BWP during the number of consecutive unscheduled slots.

Aspect 14: The method of Aspect 13, wherein the number of consecutive unscheduled slots is based at least in part on one or more of a preparation time associated with the RF retune or an interruption time associated with the dynamic RF retune mode.

Aspect 15: The method of Aspect 12, wherein performing the RF retune in the dynamic RF retune mode includes: monitoring a PDCCH to identify unscheduled slots; determining that a maximum number of slots have elapsed without identifying a number of consecutive unscheduled slots that can accommodate the RF retune; and performing the RF retune to the union bandwidth or the RF retune to the active BWP after the maximum number of slots have elapsed.

Aspect 16: The method of any of Aspects 6-15, wherein the RF retune to the union bandwidth is performed based at least in part on determining that a next scheduled reception of one or more of the SSB or the CS0 is within a timing threshold.

Aspect 17: The method of any of Aspects 6-15, further comprising: receiving one or more of the SSB or the CS0 in the union bandwidth; and performing, in the dynamic RF retune mode, an RF retune from the union bandwidth to the active BWP after receiving one or more of the SSB or the CS0 based at least in part on determining that a next scheduled reception of one or more of the SSB or the CS0 is not within a timing threshold.

Aspect 18: The method of Aspect 17, wherein performing the RF retune from the union bandwidth to the active BWP is further based at least in part on estimated downlink traffic activity or estimated uplink traffic activity satisfying a threshold.

Aspect 19: The method of any of Aspects 6-18, further comprising: receiving one or more of the SSB or the CS0 in the union bandwidth; and remaining in the union bandwidth after receiving one or more of the SSB or the CS0 based at least in part on estimated downlink traffic activity or estimated uplink traffic activity failing to satisfy a threshold.

Aspect 20: The method of any of Aspects 1-19, further comprising: receiving, from the network node, information configuring a paging search space as a non-zero common search space associated with a CORESET within the active BWP; and monitoring the paging search space for a notification related to an SI modification or a public warning system communication, wherein the RF retune to the union bandwidth is performed to receive the SI modification or the PWS communication in an SIB or OSI within the bandwidth associated with the CS0.

Aspect 21: The method of any of Aspects 1-20, further comprising: receiving, from the network node, information configuring one or more common search spaces outside the active BWP, wherein the union bandwidth covers the one or more common search spaces.

Aspect 22: The method of Aspect 21, wherein the one or more common search spaces include one or more of a paging search space, an SIB search space, or an OSI search space.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, from a network node and via radio resource control (RRC) signaling, information configuring an active bandwidth part (BWP) that does not include a bandwidth associated with synchronization signal block (SSB), associated with a common search space, and a control resource set zero (CS0); and performing, based at least in part on a radio frequency (RF) retune mode, an RF retune to a union bandwidth that covers the active BWP and the bandwidth associated with the SSB and the CS0.

2. The method of claim 1, wherein the RF retune mode is a static RF retune mode in which the union bandwidth covers the active BWP and the bandwidth associated with the SSB and the CS0 during one or more periods in which neither the SSB nor the CS0 is received.

3. The method of claim 2, wherein the RF retune is performed in the static RF retune mode based at least in part on receiving a message triggering a handover, receiving a paging message indicating one or more of a system information modification or a public warning system communication, or one or more measurements indicating poor channel conditions.

4. The method of claim 1, wherein the RF retune mode is a dynamic RF retune mode in which the union bandwidth covers the active BWP and the bandwidth associated with the SSB and the CS0 only during one or more periods in which the SSB or the CS0 is received.

5. The method of claim 4, wherein the RF retune is performed in the dynamic RF retune mode based at least in part on one or more measurements indicating a stable tracking condition in one or more of a time, frequency, or spatial domain.

6. The method of claim 4, wherein the RF retune is performed in the dynamic RF retune mode based at least in part on a reception rate associated with the SSB satisfying a threshold.

7. The method of claim 4, wherein one or more of the RF retune to the union bandwidth or an RF retune to the active BWP is performed during one or more uplink slots based at least in part on the dynamic RF retune mode causing an interruption to a receive operation.

8. The method of claim 4, wherein one or more of the RF retune to the union bandwidth or an RF retune to the active BWP is performed during one or more downlink slots based at least in part on the dynamic RF retune mode causing an interruption to a transmit operation.

9. The method of claim 4, wherein one or more of the RF retune to the union bandwidth or an RF retune to the active BWP is performed during one or more downlink slots or one or more uplink slots based at least in part on the dynamic RF retune mode causing an interruption to a receive operation and a transmit operation.

10. The method of claim 4, wherein one or more of the RF retune to the union bandwidth or an RF retune to the active BWP is performed during one or more unscheduled slots based at least in part on the dynamic RF retune mode causing an interruption to a receive operation and a transmit operation.

11. The method of claim 10, wherein performing the RF retune in the dynamic RF retune mode includes:

monitoring a physical downlink control channel to identify unscheduled slots;

determining that the unscheduled slots include a number of consecutive unscheduled slots that can accommodate the RF retune or that a maximum number of slots have elapsed without identifying a number of consecutive unscheduled slots that can accommodate the RF retune; and performing the RF retune to the union bandwidth or the RF retune to the active BWP during the number of consecutive unscheduled slots or after the maximum number of slots have elapsed.

12. The method of claim 4, wherein the RF retune to the union bandwidth is performed based at least in part on determining that a next scheduled reception of one or more of the SSB or the CS0 is within a timing threshold.

13. The method of claim 4, further comprising:

receiving one or more of the SSB or the CS0 in the union bandwidth; and performing, in the dynamic RF retune mode, an RF retune from the union bandwidth to the active BWP after receiving one or more of the SSB or the CS0 based at least in part on determining that a next scheduled reception of one or more of the SSB or the CS0 is not within a timing threshold.

14. The method of claim 4, further comprising:

receiving one or more of the SSB or the CS0 in the union bandwidth; and remaining in the union bandwidth after receiving one or more of the SSB or the CS0 based at least in part on estimated downlink traffic activity or estimated uplink traffic activity failing to satisfy a threshold.

15. A user equipment (UE) for wireless communication, comprising:

one or more memories; and one or more processors, coupled to the one or more memories, configured to:

receive, from a network node and via radio resource control (RRC) signaling, information configuring an active bandwidth part (BWP) that does not include a bandwidth associated with a synchronization signal block (SSB), associated with a common search space, and a control resource set zero (CS0); and perform, based at least in part on a radio frequency (RF) retune mode, an RF retune to a union bandwidth that covers the active BWP and the bandwidth associated with the SSB and the CS0.

16. The UE of claim 15, wherein the RF retune mode is a static RF retune mode in which the union bandwidth covers the active BWP and the bandwidth associated with the SSB and the CS0 during one or more periods in which neither the SSB nor the CS0 is received.

17. The UE of claim 16, wherein the RF retune is performed in the static RF retune mode based at least in part on receiving a message triggering a handover, receiving a paging message indicating one or more of a system information modification or a public warning system communication, or one or more measurements indicating poor channel conditions.

18. The UE of claim 15, wherein the RF retune mode is a dynamic RF retune mode in which the union bandwidth covers the active BWP and the bandwidth associated with the SSB and the CS0 only during one or more periods in which the SSB or the CS0 is received.

19. The UE of claim 18, wherein the RF retune is performed in the dynamic RF retune mode based at least in part on one or more measurements indicating a stable tracking condition in one or more of a time, frequency, or spatial domain.

20. The UE of claim 18, wherein the RF retune is performed in the dynamic RF retune mode based at least in part on a reception rate associated with the SSB satisfying a threshold.

21. The UE of claim 18, wherein one or more of the RF retune to the union bandwidth or an RF retune to the active BWP is performed during one or more uplink slots based at least in part on the dynamic RF retune mode causing an interruption to a receive operation.

22. The UE of claim 18, wherein one or more of the RF retune to the union bandwidth or an RF retune to the active BWP is performed during one or more downlink slots based at least in part on the dynamic RF retune mode causing an interruption to a transmit operation.

23. The UE of claim 18, wherein one or more of the RF retune to the union bandwidth or an RF retune to the active BWP is performed during one or more downlink slots or one or more uplink slots based at least in part on the dynamic RF retune mode causing an interruption to a receive operation and a transmit operation.

24. The UE of claim 18, wherein one or more of the RF retune to the union bandwidth or an RF retune to the active BWP is performed during one or more unscheduled slots based at least in part on the dynamic RF retune mode causing an interruption to a receive operation and a transmit operation.

25. The UE of claim 24, wherein the one or more processors, to perform the RF retune in the dynamic RF retune mode, are configured to:

monitor a physical downlink control channel to identify unscheduled slots;

determine that the unscheduled slots include a number of consecutive unscheduled slots that can accommodate the RF retune or that a maximum number of slots have elapsed without identifying a number of consecutive unscheduled slots that can accommodate the RF retune; and perform the RF retune to the union bandwidth or the RF retune to the active BWP during the number of consecutive unscheduled slots or after the maximum number of slots have elapsed.

26. The UE of claim 18, wherein the RF retune to the union bandwidth is performed based at least in part on determining that a next scheduled reception of one or more of the SSB or the CS0 is within a timing threshold.

27. The UE of claim 18, wherein the one or more processors are further configured to:

receive one or more of the SSB or the CS0 in the union bandwidth; and perform, in the dynamic RF retune mode, an RF retune from the union bandwidth to the active BWP after receiving one or more of the SSB or the CS0 based at least in part on determining that a next scheduled reception of one or more of the SSB or the CS0 is not within a timing threshold.

28. The UE of claim 18, wherein the one or more processors are further configured to:

receive one or more of the SSB or the CS0 in the union bandwidth; and remain in the union bandwidth after receiving one or more of the SSB or the CS0 based at least in part on estimated downlink traffic activity or estimated uplink traffic activity failing to satisfy a threshold.

29. A non-transitory computer-readable medium storing a set of instructions for wireless communication, the set of instructions comprising:

one or more instructions that, when executed by one or more processors of a user equipment (UE), cause the UE to:

receive, from a network node and via radio resource control (RRC) signaling, information configuring an active bandwidth part (BWP) that does not include a bandwidth associated with a synchronization signal block (SSB), associated with a common search space, and a control resource set zero (CS0); and perform, based at least in part on a radio frequency (RF) retune mode, an RF retune to a union bandwidth that covers the active BWP and the bandwidth associated with the SSB and the CS0.

30. An apparatus for wireless communication, comprising:

means for receiving, from a network node and via radio resource control (RRC) signaling, information configuring an active bandwidth part (BWP) that does not include a bandwidth associated with a synchronization signal block (SSB), associated with a common search space, and a control resource set zero (CS0); and means for performing, based at least in part on a radio frequency (RF) retune mode, an RF retune to a union bandwidth that covers the active BWP and the bandwidth associated with the SSB and the CS0.

* * * * *